3,644,618
STABLE COMPOSITION OF SYNTHETIC SODIUM ESTRONE SULFATE

George W. Holden, Preville, Quebec, Canada, assignor to Charles E. Frosst & Co., Montreal, Quebec, Canada
No Drawing. Continuation-in-part of application Ser. No. 523,252, Jan. 27, 1966, which is a continuation-in-part of application Ser. No. 241,135, Nov. 30, 1962. This application Oct. 29, 1968, Ser. No. 771,668
Int. Cl. A61k *17/06*
U.S. Cl. 424—100        6 Claims

ABSTRACT OF THE DISCLOSURE

The invention disclosed herein relates to a synthetic sodium estrone sulfate preparation comprising synthetic sodium estrone sulfate in admixture with a water and alcohol soluble extract of pregnant mares' urine.

---

This is a continuation-in-part of copending application Ser. No. 523,252, filed Jan. 27, 1966, now abandoned which in turn is a continuation-in-part of Ser. No. 241,135, filed Nov. 30, 1962, now abandoned.

The sodium salt of estrone sulfate is well known to possess great importance as the principal component of the water soluble estrogens extracted from the urine of pregnant mares. It is also well known that sodium estrone sulfate, as present in preparations made from extracts of pregnant mares' urine, remains stable and retains its water solubility under normal conditions of storage.

On the other hand, it is equally well known that crystalline synthetic sodium estrone sulfate spontaneously decomposes after a short time with loss of water solubility due to liberation of sodium acid sulfate and water insoluble estrone (Butenandt, Zeit, fur physiol, Chem. 1939).

For this reason it has been generally accepted that crystalline sodium estrone sulfate could not be used as such, and that its availability must depend upon that derived from natural sources, that is to say from an extract of pregnant mares' urine.

Also, for this reason, attempts have been made to circumvent this instability by preparing salts of organic bases, but up to the present time no means for utilizing the crystalline sodium salt has been disclosed.

Hence, it is highly desirable and a particular object of this invention to provide a means of preventing the spontaneous decomposition of synthetic sodium estrone sulfate.

In accordance with the present invention it has been found that a stable synthetic sodium estrone sulfate preparation can be obtained by mixing synthetic sodium estrone sulfate with an extract of pregnant mares' urine.

As used herein, the term extract of pregnant mares' urine refers to a water and alcohol soluble extract of pregnant mares' urine ordinarily containing from about 1% to about 20% of natural conjugated estrogens. Numerous procedures for preparing such extracts are described in prior patents and literature, but they may be classified into two principal types. In one type, pregnant mares' urine is extracted with a polar solvent, n-butanol being especially useful, and then the extract is subjected to various stages of purification which may increase the estrogen content. The other type is based on absorption of the estrogens onto an absorbent such as carbon and subsequent elution and purification. For the extracts with which the present invention is concerned, the purification ordinarily does not proceed beyond the point of increasing the estrogen content above about 20%, although extracts having a higher estrogen content up to about 30% may be employed if desired. It is especially preferred to utilize an extract of pregnant mares' urine having a natural conjugated estrogen content within the range of about 5% to about 12%. However, either method of preparation of the extract may be used.

Typical procedures are described in a paper by Grant and Beall in Recent Progress in Hormone Research, vol. V (1950), pages 307–334, the Encyclopedia of Chemical Technology, vol. 7, pages 519–520 (1951), Beall et al. U.S. Pat. 2,696,265, Cook et al. U.S. Pat. 2,429,398 and Cook et al. U.S. Pat. 2,551,205, the disclosures of which are hereby incorporated by reference.

The following examples illustrate the manufacture of Pregnant Mares' Urine Extract by known methods.

EXAMPLE I.—FLOW SHEET

[Extract of pregnant mares' urine]

5,046 gallons (22,707 litres) of pregnant mares' urine. . . . extract with ↓n-butanol.
13,313 litres of n-butanol extract . . . . washed with 102.5 kg. of NaOH ↓as 2.0 N solution, and 80.1 kg. of saturated NaHCO₃.
13,313 litres of washed n-butanol extract . . . . evaporate in vacuo (50° C.), adding water slowly as n-butanol is removed. Water volume ↓up to 1,200 litres.
1,200 litres of aqueous concentrate . . . . wash with ethylene dichloride (120 litres) adjust pH to 4.5 with hydrochloric acid (2 gallons) wash with ethylene dichloride—3× (120 1; 60 1: 60 litres) adjust to alkaline ↓pH (25.3 kg. of NaHCO₃).
1,200 litres of purified aqueous extract . . . . extract with n-butanol 208 litres, 3×{400 litres, 400 litres.
1,008 litres of butanol extract . . . . evaporate in vacuo (50° C.).
↓
Concentrated extract (34.95 kg.) 8% estrogen . . . . dissolve in methanol, ↓filter.
108 litres of methanolic solution of concentrated extract (102.5 kg.) Assay 12,049 g. (expressed as estrone) or 2,827 g. (expressed as sodium estrone sulfate).

---

5046 gallons (22,707 litres) of pregnant mares' urine was extracted with n-butanol, and the 13,313 litres of extract was washed with 102.5 kg. of NaOH as a 2 N solution and 80.1 kg. of NaHCO₃ as a saturated solution. The n-butanol extract was evaporated in vacuo at 50° C., water being added slowly to replace and allow for the removal of the butanol. The aqueous concentrate was diluted to 1200 litres, and washed with 120 litres of ethylene dichloride. Following a careful adjustment of pH to 4.5 with concentrated HCl, the aqueous concentrate was washed with 120, 60 and 60 litres of ethylene dichloride. The pH was adjusted to greater than 7.5 by the addition of NaHCO₃ (25.3 kg.), and the aqueous concentrate extracted three times with n-butanol (total volume 1008 l.). The butanol extract was evaporated in vacuo, affording a concentrated extract (34.95 kg.) which was dissolved in methanol and filtered, affording a methanolic solution of the extract in which the natural conjugated estrogens constituted about 8% of the extract.

Kg.
Methanolic solution of extract of natural conjugated estrogens _____ 102.5
    Concenrated extract _____ 34.95
    Conjugated estrogens _____ 2.82

EXAMPLE II 6229 gallons of pregnant mares' urine were processed by substantially the same procedure as outlined in Example I. The 43.5 kg. of extract obtained assayed 7.8% and which represented 3.385 kg. of natural conjugated estrogens, expressed as sodium estrone sulfate, calculated by the OAAC assay.

EXAMPLE III 28,274 gallons of pregnant mares' urine were processed according to Examples I and II. The natural conjugated estrogens were 7% of the extract (AOAC Assay).

EXAMPLE IV 20,300 gallons of pregnant mares' urine were processed according to Examples I and II. The natural conjugated estrogens were 7.6% of the extract, the assay employed in this case being the AOAC.

Various methods of measuring the concentration of conjugated estrogens may be used in evaluating the estrogen content of sodium estrone sulfate and they are described in the literature. One well known technique is a calorimetric method described by Barnes in the Journal of the Association of the Official Agricultural Chemists, volume 44, pages 317–319 (1961). It consists of comparing absorbence of a sample of unknown composition against a solution in benzine of U.S.P. Reference Standard estrone in the 400 to 700 m$\mu$ range. Total estrogens, as sodium estrone sulfate in mg./g. is given by the equation $(A_B/S_1) \times (C_1/W) \times 138 + d/2$ where $A_B$=baseline absorbence of the sample solution; $S_1$=baseline absorbence of standard solution, $C_1$=mg. estrone in standard aliquot, W=g. sample, and $d$=Na equilin sulfate in mg./g. separately determined colorimetrically against USP Reference Standard equilin after treatment of another with Fe-Kober reagent. This method will be referred to herein as the AOAC assay.

A composition in accordance with the present invention comprises synthetic sodium estrone sulfate in admixture with an extract prepared from the urine of pregnant mares in which the natural conjugated estrogens constitute from about 1% to about 30% of said extract, and the synthetic sodium estrone sulfate constitutes from about 10% to about 90% of the total estrogens in the mixture. I ordinarily employ an extract of pregnant mares' urine in which the estrogen content is within the range of about 1% to about 20%, and preferably within the range of about 5% to about 12%. While the synthetic sodium estrone sulfate component of the mixture can vary from about 10% to about 90% of the total estrogen content, the preferred range is from about 40% to about 75%. Said composition may also include additional therapeutic substances, e.g. other hormonal products, antibiotics, tranquilizers, muscle relaxants, and the like, as well as pharmacologically-acceptable carriers, such as tricalcium phosphate, calcium carbonate, magnesium carbonate, celite, silica gel, powdered cellulose, lactose, starch, sodium bicarbonate, and the like.

It is surprising to find that an extract of estrogenic conjugates derived from pregnant mares' urine possesses the factors required to stabilize not only the amount of naturally occurring estrone sulfate but also a much larger amount of normally unstable synthetic sodium estrone sulfate.

EXAMPLE V

A methanol solution of 1.887 g. of an extract prepared from the urine of pregnant mares was mixed with a methanol solution containing 0.663 g. of synthetic sodium estrone sulfate. The methanol was removed in vacuo at 40–50° C. to obtain a brown free-flowing hygroscopic powder.

The stability of the synthetic sodium estrone sulfate in the powder, as compared with that of a control sample of the crystalline sodium estrone sulfate is shown by the table, due account in the assay being taken of the natural estrogens present in the powder.

TABLE

| Sample | Storage conditions | Percent recovery of conjugated estrogen |
| --- | --- | --- |
| Crystalline sodium estrone sulfate used to make powder. | 70 days at room temperature. | 80 |
| Do | 2 weeks at 45° C | 42 |
| Powder | 1 month at room temperature. | 100 |
| Do | 2 months at room temperature. | 100.6 |
| Do | 3 months at room temperature. | 94.4 |
| Do | 4 months at room temperature. | ¹ 103.0 |
| Do | 4 months at room temperature plus 1 month at 45° C. | 99.0 |

¹ Sample redried in vacuum before assay.

EXAMPLE VI

A production batch totalling 108.72 kgs. of powder is made by mixing 95.75 kgs. of tricalcium phosphate with 26.594 litres of a methanolic solution of an extract of pregnant mares' urine weighing 10.3 kgs., prepared according to the methods of Examples 1 to 4, containing as natural conjugated estrogens 37.966 mg./ml. (9.7%) and 48.7 litres of a methanolic solution of synthetic sodium estrone sulfate containing 39.5 mg./ml. (66% of the total estrogens), and the preparation is dried in vacuo at 40° C. to remove the solvent and to afford a free flowing powder.

Stability studies carried out for a period of 30 months at room temperature showed no change in the estrone sulfate content of this preparation as determined by AOAC assay.

EXAMPLE VII

Additional batches of powder prepared as in Example VI were tested for stability and the results are as listed below: (see attached).

EXAMPLE VII

| Initial estrone conjugate per gram derived from— | | | | | |
| --- | --- | --- | --- | --- | --- |
| PMU by assay | Synthetic sodium estrone sulfate by assay | Initial total estrone conjugate per gram | Months of storage at R.T. | Estrone conjugate content found by assay | Percent of initial content |
| 6.66 | 16.34 | 23.00 | 29 | 23.10 | 100.4 |
| 4.86 | 17.33 | 22.19 | 27 | 22.00 | 99.1 |
| 6.72 | 17.75 | 24.47 | 24 | 24.60 | 100.5 |
| 6.30 | 16.75 | 23.05 | 23 | 23.00 | 99.7 |

Various changes and modifications may be made in carrying out the present invention without departing from the spirit and scope thereof. Insofar as these changes and modifications are within the purview of the annexed claims, they are to be considered as part of our invention.

What is claimed is:

1. A composition comprising unstable crystallive synthetic sodium estrone sulfate stabilized by admixture with a water and alcohol-soluble extract of pregnant mares' urine containing natural conjugated estrogens in an amount constituting about 1% to about 30% of said extract, and characterized in that the synthetic sodium estrone sulfate constitutes from about 10% to about 90% of the total estrogen content of said composition.

2. A composition comprising unstable crystalline synthetic sodium estrone sulfate stabilized by admixture with an extract of pregnant mares' urine characterized in that said extract is water and alcohol-soluble and contains from about 5% to about 12% of natural conjugated estrogens; and that the synthetic sodium estrone sulfate constitutes from about 40% to about 75% of the total estrogen content of said composition.

3. A composition comprising unstable crystalline synthetic sodium estrone sulfate stabilized by admixture with an extract of pregnant mares' urine, said extract being characterized as being water and butanol-soluble and containing approximately 8% of natural conjugated estrogens; and the proportion of synthetic sodium estrone sulfate in said composition being approximately 65% of the total estrogen content.

4. A composition comprising unstable crystalline synthetic sodium estrone sulfate stabilized by admixture with an extract of pregnant mares' urine, said extract being characterized as being water and alcohol-soluble and containing approximately 10% of natural conjugated estrogens and the proportion of synthetic sodium estrone sulfate in said composition being approximately 60% of the total estrogen content.

5. A composition comprising unstable crystalline synthetic sodium estrone sulfate stabilized by admixture with a pharmacologically-acceptaable carrier and a water and alcohol-soluble extract of pregnant mares' urine containing natural conjugated estrogens in an amount constituting about 1% to about 30% of said extract, and characterized in that the synthetic sodium estrone sulfate constitutes from about 10% to about 90% of the total estrogen content of said composition.

6. A composition comprising unstable crystalline synthetic sodium estrone sulfate stabilized by admixture with a pharmacologically-acceptable carrier and an extract of pregnant mares' urine characterized in that said extract is water and alcohol-soluble and contains from about 5% to about 12% of natural conjugated estrogens; and that the synthetic sodium estrone sulfate constitutes from about 40% to about 75% of the total estrogen content of said composition.

References Cited
UNITED STATES PATENTS

| | | | |
|---|---|---|---|
| 2,519,516 | 8/1950 | Turner et al. | 424—100 |
| 2,551,205 | 5/1951 | Cook et al. | 424—100 |
| 2,675,342 | 4/1954 | Lee et al. | 424—239 |

SAM ROSEN, Primary Examiner

U.S. Cl. X.R.
424—239, 243